Aug. 14, 1956     P. A. MARSAL     2,759,038
GAS PERMEABLE MEMBRANE FOR AIR-DEPOLARIZED CELL
Filed Feb. 10, 1954
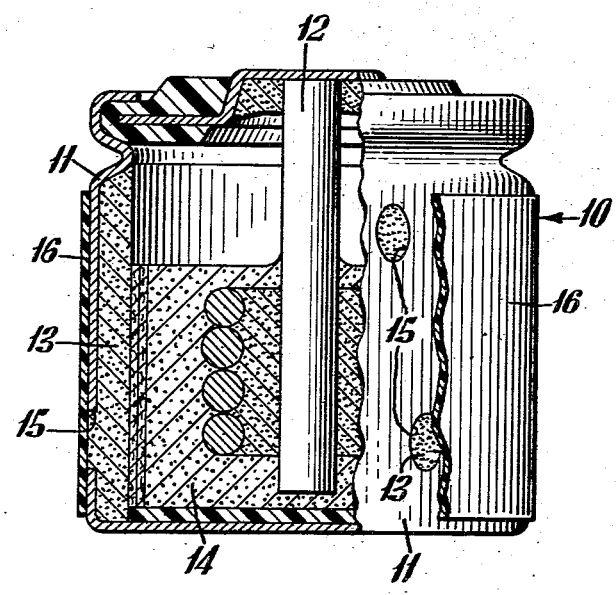
INVENTOR
PAUL A. MARSAL
BY *John F. Hohmann*
ATTORNEY

United States Patent Office 2,759,038
Patented Aug. 14, 1956

2,759,038

GAS PERMEABLE MEMBRANE FOR AIR-DEPOLARIZED CELL

Paul A. Marsal, Rocky River, Ohio, assignor to Union Carbide and Carbon Corporation, a corporation of New York Application February 10, 1954, Serial No. 409,435

9 Claims. (Cl. 136—136)

This invention relates to improvements in primary cells of the air-depolarized cathode type, and more particularly concerns gas permeable membrane covers for air-depolarized cells.

In the conventional primary battery of the air-depolarized cell type, as for example one comprising an anode of zinc, a porous, active, carbon cathode and an electrolytic solution therebetween, the air takes part in the battery reaction in the following manner. In cell containers of the type illustrated in the patent to P. A. Marsal et al., 2,597,116, issued May 20, 1952, suitably located ports or openings may be provided in the cell walls to allow air to contact exposed portions of the carbon cathode. In other cell constructions, for example conventional air-depolarized cells such as those used for railway signal service, the entire upper surface of the carbon cathode may be directly exposed to the atmosphere, or the atmospheric air may traverse an inner chamber in the cell to reach the cathode breathing surfaces. In all instances, the carbon sorbs the oxygen, and through a process of diffusion and migration, makes it available in active form at the electrode-electrolyte interface. The depolarization or cathodic reduction reaction then converts the oxygen into a peroxy compound, which under ordinary conditions of cell use is quickly dissipated.

The functioning of the active carbon cathodes may be impaired in a number of ways. If the humidity of the atmosphere is relatively high, some of the contained moisture in the air may be retained in the carbon pores, thereby reducing the further sorption of atmospheric air. The moisture and water vapor reaching the interior of the cell dilutes the electrolyte, increases the electrolyte volume, and thus creates a leakage hazard. Conversely, if the humidity of the ambient air is low, moisture will escape from the cell. Where the cell is of the so-called "dry" type, any considerable moisture loss will cause electrolyte shrinkage, and thus limit the useful life of the cell. Also, there is a tendency for some of the carbon dioxide in the air to enter the cell where it is absorbed by the caustic electrolyte with loss of electrolyte effectiveness due to lower cconductivity, lower oxide solubility and greater tendency to form adherent oxide films.

For these and other reasons, it is important that the moisture gain or loss of an air-depolarized cell be reduced without obstructing the passage of atmospheric oxygen into the cell to fulfill the depolarization requirements thereof.

It is, therefore, an important object of the present invention to reduce the transfer into, or the escape of moisture from, air-depolarized cells.

Another object of the invention is to provide in primary cells of the air-depolarized type means for occluding oxygen of the air, to promote depolarization of the cathode.

Still another object of the present invention is to reduce the transfer of moisture into or out of cells of the air-depolarized type, and at the same time to occlude sufficient oxygen from the air so as to efficiently and effectively depolarize the cell.

Other objects, features and advantages of the present invention will be apparent from the following detailed description of a preferred embodiment thereof, taken in conjunction with the accompanying drawing, in which the figure is a front elevational view partly in section, illustrating the principles of the present invention.

In its broadest aspects, the principles and features of the present invention are involved in the reduction of moisture transmission through the porous carbon cathode of an air-depolarized cell, and the maintenance of a flow of oxygen from the air into the interior of the cell for the purpose of depolarizing the carbon electrode. Briefly, referring to Fig. 1, a conventional "dry" type air-depolarized cell 10 may comprise an impervious shell casing 11 having therein an anode 12 such as amalgamated zinc, a carbon cathode 13 and some form of electrolyte solution 14, such as sodium hydroxide.

Vent openings or breather ports 15 are provided in the casing to allow the cell 10 to breathe. Specifically, these openings permit access of atmospheric air into the cell. The oxygen of the air is occluded by the carbon cathode 13, and is thereafter utilized during cell discharge to perform its depolarization function at the carbon cathode-electrolyte interface.

In the normal course of operation, a number of factors will tend to impair the functioning of the cell. One of the most serious of these concerns a change in the moisture content of the cell. This may be manifested in several ways. First, the water from the electrolyte solution 14 may evaporate due to low humidity conditions in the atmosphere, causing dessication in the cell. Second, the atmospheric humidity may be so high as to cause condensation of water vapor in the pores of the activated carbon cathode 13. Or third, a high concentration of water vapor in the carbon may lead to vapor diffusion into the electrolyte causing dilution of the electrolyte, and, as a result of the consequent increase in the electrolyte volume, create a leakage hazard in the cell. In each instance, the change in moisture content of the cell will seriously affect its useful life.

One of the difficulties involved in reducing the movement of moisture in a cell of the air-depolarized type lies in the fact that a reduction in the accessibility of moisture to the cell is usually accompanied by a corresponding reduction in the availability of depolarizing air. Naturally a reduction in the flow of air will correspondingly limit the rate of discharge of the battery.

It has been discovered that certain materials are impermeable to moisture and permeable to gases. By covering the vent openings in an air-depolarized cell with a covering 16 made from any of these gas permeable materials, the tendency for the moisture content of the cell to change in accordance with atmospheric conditions is substantially retarded, and the accessibility of air to the interior of the cell is not seriously impeded. A number of materials may be suitable for the purpose at hand to produce the desired effects. Plastic compositions such as polyethylene, ethyl cellulose, or the like, have been found to produce satisfactory results.

Moreover, according to the present invention, a thin film of polyethylene exhibits the further characteristic of selective sorption of the oxygen component of the air to the substantial exclusion of nitrogen and carbon dioxide present in the air. Tests have shown that a polyethylene film passes oxygen rather readily, but is only one-third as permeable to nitrogen.

Tests have shown that the thickness of the material to be used as a moisture screen and air transmitter should not be so great as to render it impermeable to both air and moisture, nor so thin as to allow the sorption of all of the gas constituents in the atmosphere. On the other hand, maximum thickness must be such as not to offer any serious resistance to air flow, so that an amount of air for depolarization purposes proportional to the current demands of the cell enters through the cell vents. On the basis of experimental results, a polyethylene film having a thickness of .003 inch has been found to give satisfactory results.

In the present invention, as a result of the selective permeable action of the polyethylene membrane covering the breather ports of an air-depolarized primary cell, an oxygen enriched stream of air is available for depolarization purposes. This enriched air affords a more efficient use of the air as a depolarizer than is possible in the conventional air-depolarized cell operating without a plastic vent covering. As a consequence, higher and more sustained voltage levels are afforded with little if any moisture transfer into or out of the cell.

Typical test results obtained from air-depolarized cells having plastic membranes according to this invention, in comparison with control cells having conventional breather spaces communicating directly with the atmosphere are set forth in the following table. In these tests, the cells were stored for the periods indicated over calcium chloride in a dessicator having a nitrogen atmosphere, and their moisture loss was determined at the end of such periods.

| Time | Percent moisture lost at 70° F. | |
|---|---|---|
| | Polyethylene film | Control (no membrane) |
| 1 week | 2.0 | 24.0 |
| 2 weeks | 4.0 | 41.4 |
| 3 weeks | 6.0 | 52.0 |

Primary cells of the air-depolarized type having polyethylene membranes have shown improved cell life at rated capacity amounting in some instances to approximately 60% over similar cells operating without plastic moisture barriers. Cells having polyethylene membranes 3 mils thick, operate on 1200 ohm light loads at average voltages which are .02 to .03 volt higher than control cells operating without the advantage of plastic films.

Where greater selective permeability of oxygen is desired, an ethyl cellulose plastic membrane may be used instead of a polyethylene film. Although the moisture transmission characteristics of the ethyl cellulose material are not as low as those of polyethylene, its oxygen transmission is much higher, being at times as much as six times more effective than polyethylene.

In practice, the gas-permeable film may be suitably fitted over the surface of the cell in which the vent is provided. Preferably polyethylene tubing or other suitable plastic material is shrunk onto the cell surface so as to cover the breathing holes of the cell.

From the above description it will, therefore, be understood that according to this invention, plastic film materials are provided over the breather ports of air-depolarized cells for impeding vapor transmission in both directions through such cells, and improving depolarization action therewithin, all to the end that longer cell life is effected.

It is to be understood that variations and modifications may be effected without departing from the novel concepts of the present invention.

I claim:

1. In an air-depolarized cell having breather spaces for the passage of air into the interior of the cell, the improvement comprising an oxygen-permeable, water-impermeable, plastic membrane covering said breather space.

2. In an air-depolarized cell including an impervious outer cell wall, an active porous carbon cathode and an anode within said cell, an electrolyte solution between said anode and said cathode, and vent openings provided in said cell wall for the passage of air to said porous cathode, the improvement comprising a moisture-repellent, oxygen-permeable plastic film mounted on the cell over said vent openings.

3. In an air-depolarized cell having breather spaces for the passage of air into the interior of the cell, a thin polyethylene membrane covering said breather space, said membrane being selectively permeable to oxygen in said air and substantially impermeable to vapor transmission in both directions in said cell.

4. In an air-depolarized cell including an impervious outer cell wall, an active porous carbon cathode and an anode within said cell, an electrolyte solution between said anode and said cathode, and vent openings provided in said cell wall for the passage of air to said porous cathode, the improvement comprising a polyethylene film mounted on the cell over said vent openings, said film having selective oxygen transmissibility qualities and being substantially moisture repellent.

5. In an air-depolarized cell provided with openings for the admission of depolarizing air, polyethylene film means for preventing moisture sorption into or out of said cell openings, said means being characterized by selective transmissibility qualities of preventing the sorption of carbon dioxide and nitrogen from the air, and simultaneously occluding the oxygen from the air.

6. In an air-depolarized cell having breather ports for the passage of air into the interior of the cell, a thin ethyl cellulose membrane covering said breather ports, said membrane being selectively permeable to oxygen in said air, and substantially impermeable to water vapor in said air and said cell.

7. In an air-depolarized cell including an impervious outer cell wall, an active porous carbon cathode and an anode within said cell, an electrolyte solution between said anode and said cathode, and vent openings provided in said cell wall for the passage of air to said porous cathode, the improvement comprising an ethyl cellulose film mounted on the cell over said vent openings, said film having selective oxygen transmissibility qualities and being substantially moisture repellent.

8. In an air-depolarized cell, provided with openings for the admission of depolarizing air, ethyl cellulose film means for preventing moisture sorption into or out of said cell, said means being characterized by selective transmissibility qualities of preventing the sorption of carbon dioxide and nitrogen from the air, and simultaneously occluding the oxygen from the air.

9. In an air-depolarized cell provided with breather ports for the admission of depolarizing air, plastic film means covering said ports for preventing the movement of water vapor in both directions through said ports, said film means having a thickness such as to render said film means selectively permeable to oxygen in the air, and substantially less permeable to nitrogen and carbon dioxide in the air.

References Cited in the file of this patent

UNITED STATES PATENTS

| | | |
|---|---|---|
| 1,969,630 | Sprague et al. | Aug. 7, 1934 |
| 2,571,927 | Neumann et al. | Oct. 16, 1951 |
| 2,572,918 | Fisher et al. | Oct. 30, 1951 |
| 2,597,116 | Marsal et al. | May 20, 1952 |
| 2,597,117 | Schumacher et al. | May 20, 1952 |
| 2,632,032 | Winckler | Mar. 17, 1953 |
| 2,641,623 | Winckler et al. | June 9, 1953 |